United States Patent
Takemoto

(10) Patent No.: US 11,077,765 B2
(45) Date of Patent: Aug. 3, 2021

(54) CONTROLLER FOR DC-DC CONVERTER AND DC-DC CONVERTER

(71) Applicant: TOYOTA JIDOSHA KABUSHIKI KAISHA, Toyota (JP)

(72) Inventor: Taiki Takemoto, Anjyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/842,320

(22) Filed: Apr. 7, 2020

(65) Prior Publication Data
US 2020/0376971 A1 Dec. 3, 2020

(30) Foreign Application Priority Data
May 29, 2019 (JP) .............................. JP2019-100490

(51) Int. Cl.
*B60L 53/22* (2019.01)
*H02J 7/34* (2006.01)
*B60L 50/40* (2019.01)
*B60L 50/60* (2019.01)
*B60K 6/28* (2007.10)

(52) U.S. Cl.
CPC .............. *B60L 53/22* (2019.02); *B60L 50/40* (2019.02); *B60L 50/66* (2019.02); *H02J 7/345* (2013.01); *B60K 6/28* (2013.01); *B60L 2210/10* (2013.01); *B60L 2210/14* (2013.01); *B60Y 2200/91* (2013.01); *B60Y 2200/92* (2013.01); *H02J 2207/20* (2020.01)

(58) Field of Classification Search
CPC ....... B60Y 2200/92; B60K 6/28; B60L 50/66; B60L 2210/14; B60L 53/22; H02J 7/345; H02J 2207/20
See application file for complete search history.

(56) References Cited

U.S. PATENT DOCUMENTS

| | | | |
|---|---|---|---|
| 2009/0108674 A1* | 4/2009 | Ozaki | B60L 50/16 307/10.6 |
| 2009/0146493 A1* | 6/2009 | Fujino | B60L 15/2045 307/9.1 |
| 2012/0043923 A1* | 2/2012 | Ikriannikov | H02J 1/10 320/103 |

FOREIGN PATENT DOCUMENTS

JP 2007-295699 A 11/2007

* cited by examiner

*Primary Examiner* — Jared Fureman
*Assistant Examiner* — Duc M Pham
(74) *Attorney, Agent, or Firm* — Oliff PLC

(57) ABSTRACT

A DC-DC converter is mounted on a vehicle. The DC-DC converter includes: a bidirectional DC-DC converter that is connected between a capacitor for pre-charging connected to a first battery and a second battery differing from the first battery and can perform bidirectional output; and a unidirectional DC-DC converter that is connected in parallel with the bidirectional DC-DC converter and can perform output in one direction to a side of the second battery. During activation of the vehicle, the controller actuates the bidirectional DC-DC converter to start pre-charging the capacitor by using power of the second battery and starts actuating the unidirectional DC-DC converter later than initiation of the actuation of the bidirectional DC-DC converter.

10 Claims, 10 Drawing Sheets

CONTROLLER FOR DC-DC CONVERTER AND DC-DC CONVERTER

CROSS-REFERENCE TO RELATED APPLICATION

The disclosure of Japanese Patent Application No. 2019-100490 filed on May 29, 2019 including the specification, drawings and abstract is incorporated herein by reference in its entirety.

BACKGROUND

1. Technical Field

The disclosure relates to a DC-DC converter mounted on a vehicle and to a controller controlling the DC-DC converter.

2. Description of Related Art

In a vehicle on which a system using a high-voltage battery for driving the vehicle is mounted, connection and disconnection between the high-voltage battery and high-voltage in-vehicle equipment, which uses the high-voltage battery as a power supply source, are controlled via a main relay.

An example of such a system includes a relay circuit in which a relay dedicated for pre-charging and having a resistance component and a main relay are provided in parallel. The relay circuit is used to prevent welding of a terminal in the main relay, which is caused by a large current therethrough at the time when the high-voltage battery is connected to the high-voltage in-vehicle equipment, for example, during activation of the vehicle. In the relay circuit, when the high-voltage battery is connected to the high-voltage in-vehicle equipment, the relay dedicated for the pre-charging is first connected therebetween to pre-charge a capacitor, which is inserted in the high-voltage in-vehicle equipment, at a suited current via the resistance component. Then, when the pre-charging of the capacitor is completed, the main relay is connected therebetween.

As a measure against welding of the terminal in the main relay, Japanese Patent Application Publication No. 2007-295699 (JP 2007-295699 A) discloses a technique of adopting a bidirectional DC-DC converter capable of increasing/lowering a voltage and connecting between the high-voltage battery and a low-voltage battery (for example, an auxiliary battery) in such a manner as to allow power conversion, supplying the power from the low-voltage battery to the capacitor to pre-charge the capacitor in a disconnected state of the main relay during the activation of the vehicle, and thereby eliminating the need for the relay dedicated for the pre-charging.

SUMMARY

It is expected that, with an increase in the number of the in-vehicle equipment, there is an increasing demand for the power by low-voltage in-vehicle equipment that uses the low-voltage battery as the power supply source. In the case where the existing bidirectional DC-DC converter in the system is insufficient for the increasing demand for the power on the side of the low-voltage in-vehicle equipment, it is considered to add a unidirectional DC-DC converter, which supplies the power in one direction from the high-voltage battery to the low-voltage in-vehicle equipment, in parallel with the bidirectional DC-DC converter to meet the demand.

However, in a configuration in which the high-voltage battery and the low-voltage battery are connected in parallel by the bidirectional DC-DC converter and the unidirectional DC-DC converter, it has not been sufficiently investigated how to control each of the DC-DC converters to suitably pre-charge the capacitor.

The disclosure has been made in view of the above problem and therefore has a purpose of providing a controller capable of suitably controlling each DC-DC converter for pre-charging of a capacitor and a DC-DC converter executing suitable control for the pre-charging of the capacitor in a configuration in which a bidirectional DC-DC converter and a unidirectional DC-DC converter are connected in parallel.

In order to solve the above problem, an aspect of the disclosure is a controller for a DC-DC converter mounted on a vehicle. The DC-DC converter includes: a bidirectional DC-DC converter that is connected between a capacitor for pre-charging connected to a first battery and a second battery differing from the first battery and can perform bidirectional output; and a unidirectional DC-DC converter that is connected in parallel with the bidirectional DC-DC converter and can perform output in one direction to a side of the second battery. During activation of the vehicle, the controller actuates the bidirectional DC-DC converter to start pre-charging the capacitor by using power of the second battery, and starts actuating the unidirectional DC-DC converter later than initiation of the actuation of the bidirectional DC-DC converter.

Another aspect of the disclosure is a DC-DC converter that is connected between a primary side and a secondary side in parallel with a bidirectional DC-DC converter capable of performing bidirectional output and can perform unidirectional output from the primary side to the secondary side. The bidirectional DC-DC converter includes: a monitoring section that monitors a current flowing from the primary side in a direction toward the secondary side; and a control section that performs output when the current monitored by the monitoring section is equal to or larger than a specified current value, and that stops the output when the monitored current is smaller than the specified current value.

The above disclosure can provide a controller capable of suitably controlling each of the DC-DC converters for pre-charging of a capacitor and the DC-DC converter executing suitable control for the pre-charging of the capacitor in a configuration in which the bidirectional DC-DC converter and the unidirectional DC-DC converter are connected in parallel.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In the disclosure, with a configuration in which a bidirectional DC-DC converter and a unidirectional DC-DC converter mounted on a vehicle are connected in parallel, actuation initiation timing of the unidirectional DC-DC converter is delayed from actuation initiation timing of the bidirectional DC-DC converter during activation of the vehicle. In this way, pre-charging of a capacitor is suitably controlled.

A detailed description will hereinafter be made on embodiments of the disclosure with reference to the drawings.

First Embodiment

Configuration

Figure 1:
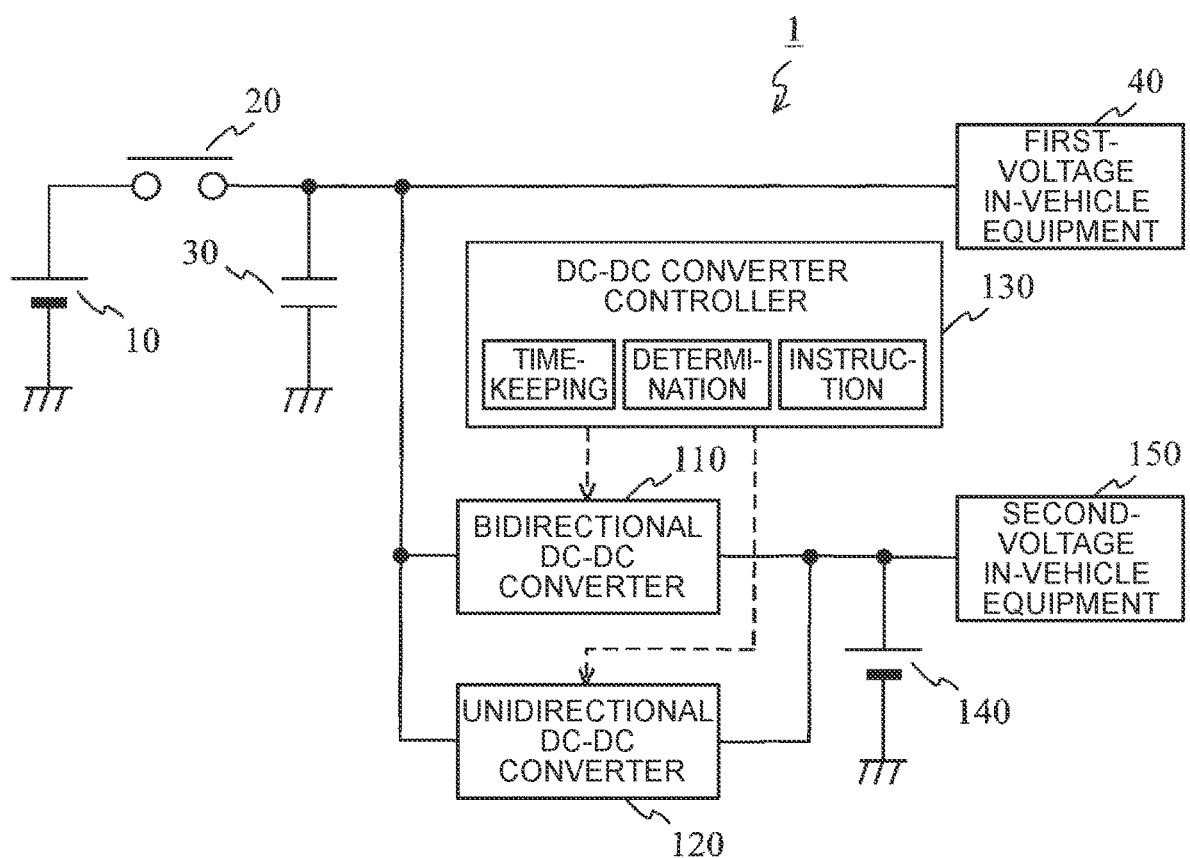
FIG. 1 is a schematic configuration diagram of a power supply system that includes a DC-DC converter controller according to a first embodiment.

FIG. 1 is a block diagram illustrating a schematic configuration of a power supply system 1 that includes a DC-DC converter controller according to a first embodiment. The power supply system 1 exemplified in FIG. 1 includes a first battery 10, a main relay 20, a capacitor 30, first-voltage in-vehicle equipment 40, a bidirectional DC-DC converter 110, a unidirectional DC-DC converter 120, a DC-DC converter controller 130 of this embodiment, a second battery 140, and second-voltage in-vehicle equipment 150. In FIG. 1, power lines are indicated by solid lines, and control signal lines are indicated by broken lines. As the vehicle on which the power supply system 1 is mounted, a hybrid vehicle (HV) or an electric vehicle (EV) can be exemplified.

The first battery 10 is a secondary battery, such as a lithium-ion battery, configured to be chargeable/dischargeable, and is a driving battery mounted on the vehicle as a high-voltage power supply source, for example. The first battery 10 is connected to the first-voltage in-vehicle equipment 40, the bidirectional DC-DC converter 110, and the unidirectional DC-DC converter 120 via the main relay 20 so as to be able to supply the power thereto.

The second battery 140 is a secondary battery, such as a lead-acid battery, configured to be chargeable/dischargeable, and is an auxiliary battery mounted on the vehicle as a low-voltage power supply source, for example. The second battery 140 is connected to the second-voltage in-vehicle equipment 150 so as to be able to supply the power thereto.

The capacitor 30 is a capacity element for pre-charging that is executed before the main relay 20 becomes conductive. The capacitor 30 is connected in parallel with the first battery 10 to a power supply line connecting the main relay 20 and the first-voltage in-vehicle equipment 40.

The first-voltage in-vehicle equipment 40 is equipment that is mounted on the vehicle and operated by the power supplied from the first battery 10. The first-voltage in-vehicle equipment 40 can be a travel motor, a starter motor, or the like, for example.

The second-voltage in-vehicle equipment 150 is equipment that is mounted on the vehicle and operated by the power supplied from the second battery 140. The second-voltage in-vehicle equipment 150 can be a lighting device, a power steering device, or the like, for example.

The bidirectional DC-DC converter (hereinafter described as a "bidirectional DDC") 110 is a DC-DC converter that is connected between the capacitor 30 and the second-voltage in-vehicle equipment 150, that can convert a voltage bidirectionally according to an instruction of the DDC controller 130, and can output the converted voltage. More specifically, the bidirectional DDC 110 supplies the power of the first battery 10, which is connected to a primary side, to the second battery 140 and the second-voltage in-vehicle equipment 150, which are connected to a secondary side. In addition, the bidirectional DDC 110 supplies the power of the second battery 140, which is connected to the secondary side, to the capacitor 30 and the first-voltage in-vehicle equipment 40, which are connected to the primary side. When supplying the power, the bidirectional DDC 110 can transform a voltage of the first battery 10, which is an input voltage on the primary side, to be an output voltage on the secondary side, and can also transform a voltage of the second battery 140, which is an input voltage on the secondary side, to be an output voltage on the primary side. For example, in the case where the first battery 10 is a high-voltage battery and the second battery 140 is a low-voltage battery whose rated voltage is lower than that of the first battery 10, the bidirectional DDC 110 lowers the voltage of the power of the first battery 10 and outputs the power to the second-voltage in-vehicle equipment 150 while increasing the voltage of the power of the second battery 140 and outputting the power to the capacitor 30.

The unidirectional DC-DC converter (hereinafter described as a "unidirectional DDC") 120 is a DC-DC converter that is connected between the capacitor 30 and the second-voltage in-vehicle equipment 150, that is connected in parallel with the bidirectional DDC 110, that can convert the voltage only in one direction according to the instruction from the DDC controller 130, and that can output the converted voltage. More specifically, the unidirectional DDC 120 supplies the power of the first battery 10, which is connected to the primary side, to the second battery 140 and the second-voltage in-vehicle equipment 150, which are connected to the secondary side. When supplying the power, the unidirectional DDC 120 can transform the voltage of the first battery 10, which is the input voltage on the primary side, to be the output voltage on the secondary side. In the case where the first battery 10 is the high-voltage battery and the second battery 140 is the low-voltage battery whose rated voltage is lower than that of the first battery 10, the unidirectional DDC 120 lowers the voltage of the power of the first battery 10 and outputs the power to the second-voltage in-vehicle equipment 150.

The DC-DC converter controller (hereinafter described as the "DDC controller") 130 controls operation of the bidirectional DDC 110 and the unidirectional DDC 120 based on a vehicle state acquired from the in-vehicle equipment. The DDC controller 130 can be constructed of an electronic control unit (ECU) that typically includes a processor, memory, an input/output interface, and the like. The DDC controller 130 can include some or all of the ECUs mounted on the vehicle, such as the ECU capable of controlling a connected/disconnected state of the main relay 20 and the ECU capable of controlling output voltage values of the bidirectional DDC 110 and the unidirectional DDC 120. The DDC controller 130 in this embodiment implements functions of timekeeping, determination, and the instruction, which will be described later, when the processor reads and executes a program stored in the memory.

Based on an ignition-ON signal and a READY-ON signal acquired from specified in-vehicle equipment, the DDC controller 130 determines whether an activating operation of the vehicle is performed. When the activating operation of the vehicle is performed, the DDC controller 130 provides an activating instruction to the bidirectional DDC 110 so as to start actuating the bidirectional DDC 110. Then, the DDC controller 130 initiates the timekeeping at timing at which the bidirectional DDC 110 starts being actuated. Thereafter, after a lapse of a specified time since the initiation of the timekeeping, the DDC controller 130 provides the activating instruction to the unidirectional DDC 120 so as to start actuating the unidirectional DDC 120. Here, the initiation of the actuation refers to a time point at which the DDC in a stop state is activated and starts outputting the specified power.

Control

Figure 2:
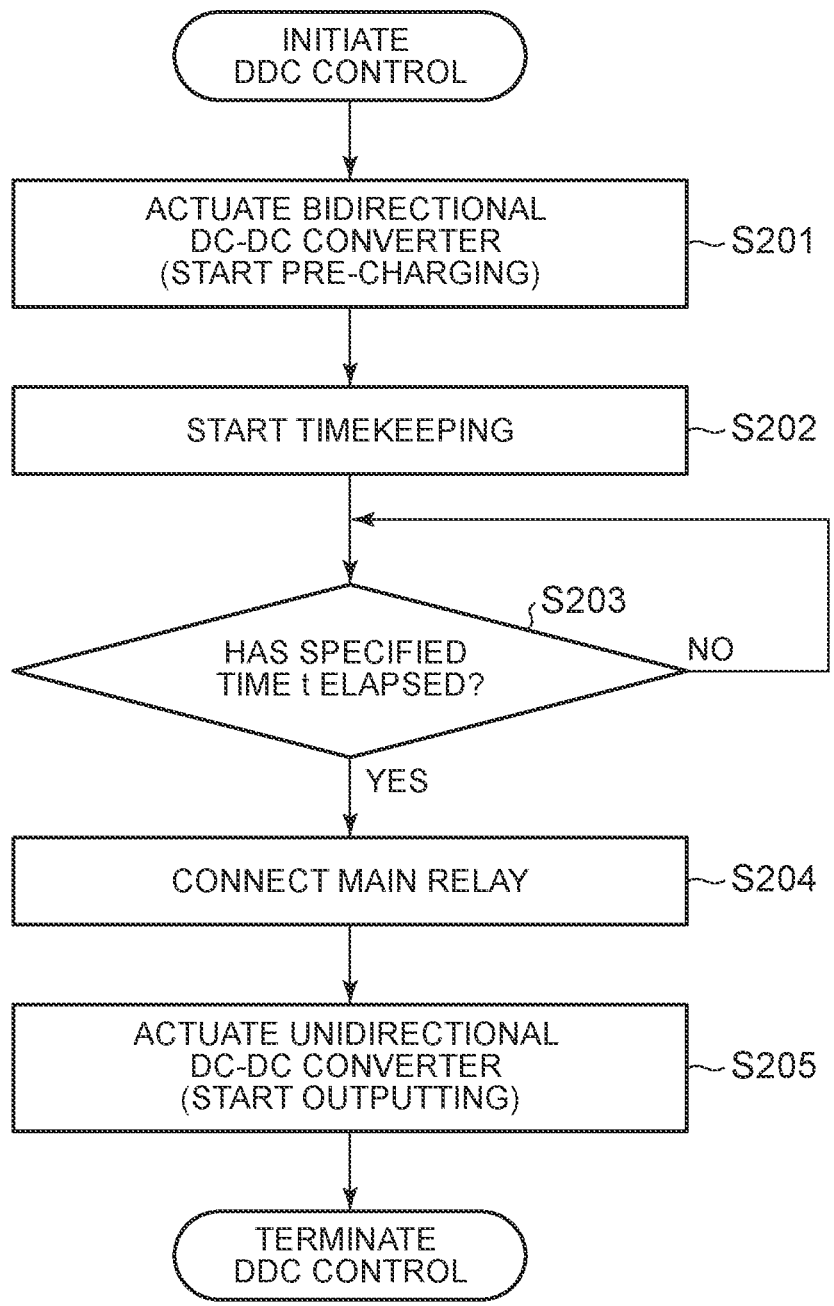
FIG. 2 is a control flowchart executed by the DC-DC converter controller illustrated in FIG. 1.

A description will be made on control executed by the DDC controller 130 according to the first embodiment with further reference to the drawing. FIG. 2 is a flowchart illustrating a processing procedure of DC-DC converter control (DDC control) executed by the DDC controller 130. The DDC control illustrated in FIG. 2 is initiated when it is determined that the activating operation of the vehicle is performed in the disconnected state of the main relay 20.

Step S201: The DDC controller 130 starts actuating the bidirectional DDC 110 and controls the bidirectional DDC 110 to a state where the power of the second battery 140 is output to the capacitor 30. In this way, the capacitor 30 starts being pre-charged by using the power of the second battery 140. At this time point, the unidirectional DDC 120 is not actuated yet.

Step S202: The DDC controller 130 starts the timekeeping when starting actuating the bidirectional DDC 110.

Step S203: The DDC controller 130 determines whether a specified time t has elapsed since the bidirectional DDC 110 starts being actuated. The specified time t is set based on a time required until the pre-charging of the capacitor 30 is completed. The specified time t is typically set to be equal to or longer than the time required until the pre-charging of the capacitor 30 is completed. The time required until the pre-charging is completed is appropriately determined based on capacity of the capacitor 30, performance of the bidirectional DDC 110, allowable supply capacity of the second battery 140, and the like. If the specified time t has elapsed (step S203, YES), the processing proceeds to step S204. If not (step S203, NO), the determination in step S203 is repeatedly made until the specified time t elapses.

Step S204: The DDC controller 130 controls the main relay 20 in the connected state. The vehicle is actually activated only after the control is terminated. Note that connection processing of the main relay 20 may be executed when the in-vehicle ECU that differs from the DDC controller 130 receives information from the DDC controller 130.

Step S205: The DDC controller 130 starts actuating the unidirectional DDC 120 and starts outputting the power from the side of the first battery 10 and the capacitor 30 to the side of the second battery 140 and the second-voltage in-vehicle equipment 150. In addition, in conjunction with the completion of the pre-charging of the capacitor 30, the DDC controller 130 switches the bidirectional DDC 110 to a state of outputting the power of the first battery 10 and the capacitor 30 to the second battery 140 and the second-voltage in-vehicle equipment 150. In this way, a high power demand for the second-voltage in-vehicle equipment 150 can be fulfilled by both of the bidirectional DDC 110 and the unidirectional DDC 120. Note that an order of the processing in above step S204 and the processing in above step S205 may be switched.

With the processing so far, the DDC control by the DDC controller 130 during the activation of the vehicle is terminated.

Operation and Effects

As it has been described so far, with the configuration that the unidirectional DDC is connected in parallel with the bidirectional DDC having the pre-charging function, when determining that the activating operation of the vehicle is performed, the DDC controller according to the first embodiment of the disclosure first actuates the bidirectional DDC to pre-charge the capacitor and then, after the lapse of the specified time since the initiation of the actuation, starts actuating the unidirectional DDC. That is, when the vehicle is activated, the DDC controller delays the actuation initiation timing of the unidirectional DDC from the actuation initiation timing of the bidirectional DDC by a predetermined specified time.

In the control of delaying the actuation initiation timing of the DDC by the specified time, when the specified time is appropriately set based on the time required until the completion of the pre-charging of the capacitor, such a route that the power to be supplied from the second battery to the capacitor for the pre-charging of the capacitor by the bidirectional DDC returns to the second battery through the unidirectional DDC is not formed. Therefore, the DDC controller can suitably pre-charge the capacitor by using the power of the second battery.

Second Embodiment

Configuration

Figure 3:
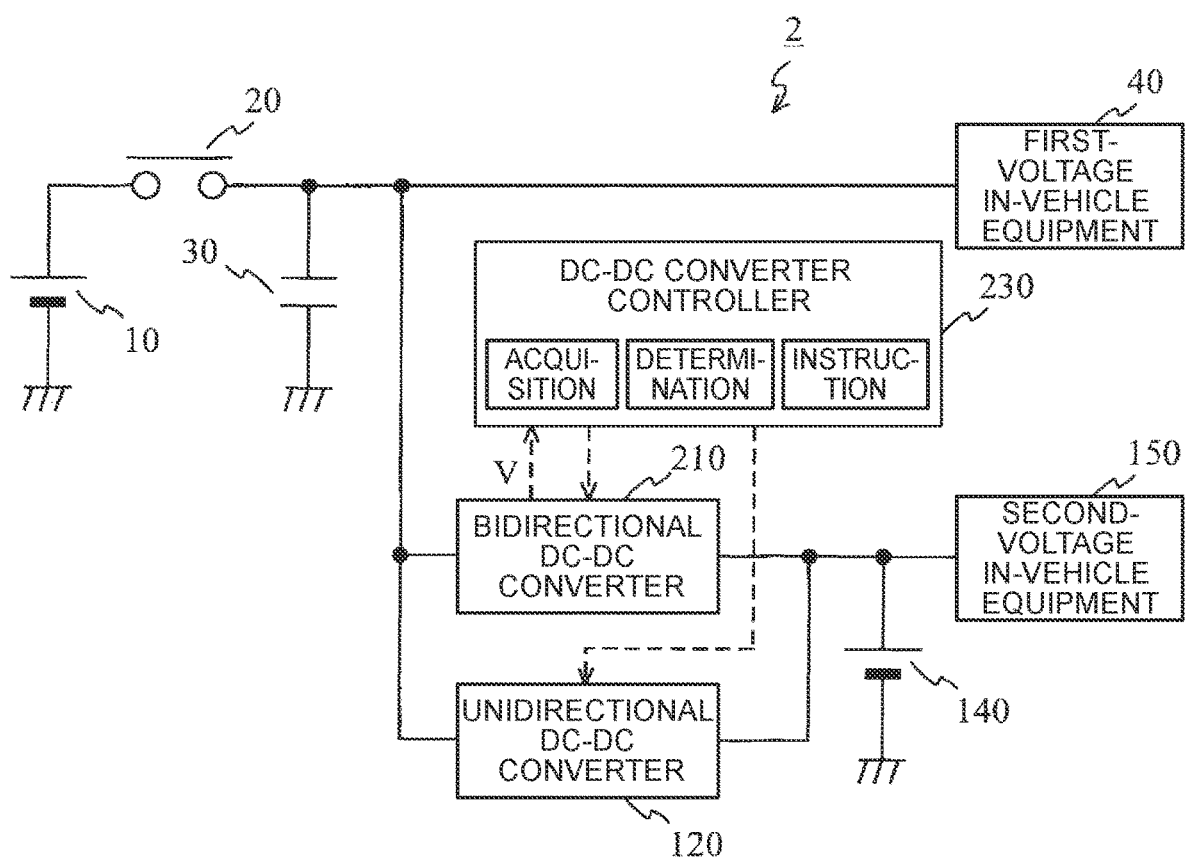
FIG. 3 is a schematic configuration diagram of a power supply system that includes a DC-DC converter controller according to a second embodiment.

FIG. 3 is a block diagram illustrating a schematic configuration of a power supply system 2 that includes a DC-DC converter controller according to a second embodiment. The power supply system 2 exemplified in FIG. 3 includes the first battery 10, the main relay 20, the capacitor 30, the first-voltage in-vehicle equipment 40, a bidirectional DDC 210, the unidirectional DDC 120, a DC-DC converter controller 230 of this embodiment, the second battery 140, and the second-voltage in-vehicle equipment 150. In FIG. 3, the power lines are indicated by solid lines, and the control signal lines are indicated by broken lines. As the vehicle on which the power supply system 2 is mounted, the hybrid vehicle (HV) or the electric vehicle (EV) can be exemplified.

The bidirectional DDC 210 and the DDC controller 230 in the power supply system 2 according to this second embodiment have different configurations from the bidirectional DDC 110 and the DDC controller 130, respectively, in the above-described power supply system 1 according to the first embodiment. Hereinafter, a description on the second embodiment will be centered on these different configurations. The same configurations will be denoted by the same reference numerals and will only partially be described.

The bidirectional DDC 210 is a DC-DC converter that is connected between the capacitor 30 and the second-voltage in-vehicle equipment 150, that can convert the voltage bidirectionally according to an instruction from the DDC controller 230, and that can output the converted voltage. More specifically, the bidirectional DDC 210 supplies the power of the first battery 10, which is connected to the primary side, to the second battery 140 and the second-voltage in-vehicle equipment 150, which are connected to the secondary side. In addition, the bidirectional DDC 210 supplies the power of the second battery 140, which is connected to the secondary side, to the capacitor 30 and the first-voltage in-vehicle equipment 40, which are connected to the primary side. When supplying the power, the bidirectional DDC 210 can transform the voltage of the first battery 10, which is the input voltage on the primary side, to be the output voltage on the secondary side, and can also transform the voltage of the second battery 140, which is the input voltage on the secondary side, to be the output voltage on the primary side. Furthermore, the bidirectional DDC 210 is configured to be able to send information on a voltage V, which is generated on a side of a terminal connected to the capacitor 30, to the DDC controller 230.

The DDC controller 230 controls operation of the bidirectional DDC 210 and the unidirectional DDC 120 based on the vehicle state acquired from the in-vehicle equipment and a state of the capacitor 30 acquired from the bidirectional DDC 210. The DDC controller 230 can be constructed of the ECU that typically includes the processor, the memory, the input/output interface, and the like. The DDC controller 230 can include some or all of the ECUs mounted on the vehicle, such as the ECU capable of controlling the connected/disconnected state of the main relay 20 and the ECU capable of controlling output voltage values of the bidirectional DDC 210 and the unidirectional DDC 120. The DDC controller 230 in this embodiment implements functions of acquisition, determination, and instruction, which will be described later, when the processor reads and executes a program stored in the memory.

Based on the ignition-ON signal and the READY-ON signal acquired from the specified in-vehicle equipment, the DDC controller 230 determines whether the activating operation is performed for the vehicle. When the activating operation of the vehicle is performed, the DDC controller 230 provides an activating instruction to the bidirectional DDC 210 so as to start actuating the bidirectional DDC 210. Then, the DDC controller 230 sequentially acquires the voltage V of the capacitor 30 sent from the bidirectional DDC 210, which has started being actuated. Thereafter, in the case where the acquired voltage V of the capacitor 30 becomes equal to or higher than a specified value, the DDC controller 230 provides the activating instruction to the unidirectional DDC 120 so as to start actuating the unidirectional DDC 120.

Control

Figure 4:
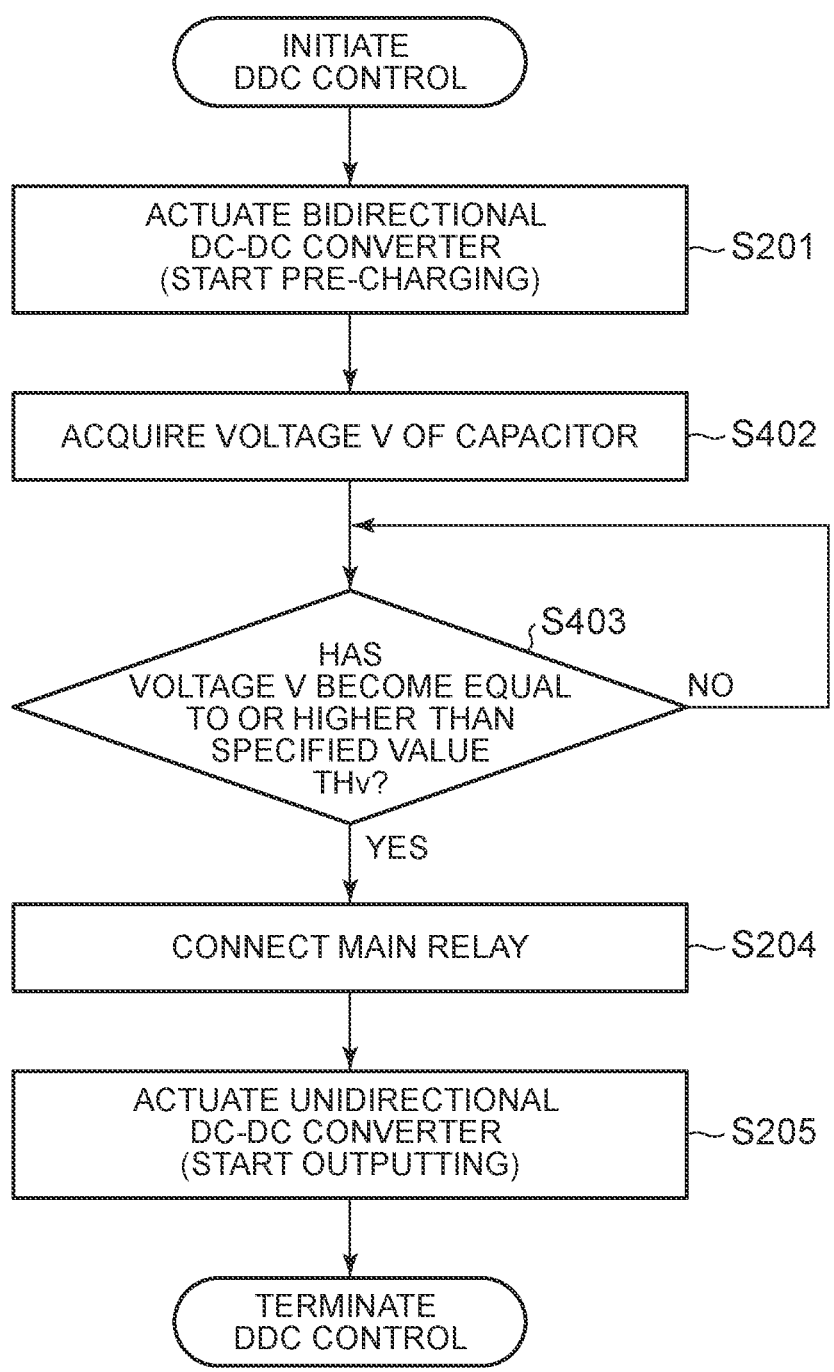
FIG. 4 is a control flowchart executed by the DC-DC converter controller illustrated in FIG. 3.

A description will be made on control executed by the DDC controller 230 according to the second embodiment with further reference to the drawing. FIG. 4 is a flowchart illustrating a processing procedure of DC-DC converter control (DDC control) executed by the DDC controller 230. The DDC control illustrated in FIG. 4 differs from the DDC control illustrated in FIG. 2 in terms of processing in steps S402 and S403.

Step S201: The DDC controller 230 starts actuating the bidirectional DDC 210 and controls the bidirectional DDC 210 to the state where the power of the second battery 140 is output to the capacitor 30. In this way, the pre-charging of the capacitor 30 is initiated.

Step S402: The DDC controller 230 sequentially acquires the voltage V of the capacitor 30 sent from the bidirectional DDC 210, which has started being actuated.

Step S403: The DDC controller 230 determines whether the voltage V of the capacitor 30 acquired from the bidirectional DDC 210 has become equal to or higher than a specified value THv. The specified value THv is typically set to the voltage of the capacitor 30 at the time when the pre-charging thereof is completed. In this way, the DDC controller 230 can detect the completion of the pre-charging of the capacitor 30. If the voltage V is equal to or higher than the specified value THv (step S403, YES), the processing proceeds to step S204. If not (step S403, NO), the determination in step S403 is repeatedly made until the voltage V becomes equal to or higher than the specified value THv.

Step S204: The DDC controller 230 controls the main relay 20 in the connected state. The vehicle is actually activated only after the control is terminated.

Step S205: The DDC controller 230 starts actuating the unidirectional DDC 120 and starts outputting the power from the side of the first battery 10 and the capacitor 30 to the side of the second battery 140 and the second-voltage in-vehicle equipment 150. In addition, in conjunction with the completion of the pre-charging of the capacitor 30, the DDC controller 230 switches the bidirectional DDC 210 to the state of outputting the power of the first battery 10 and the capacitor 30 to the second battery 140 and the second-voltage in-vehicle equipment 150.

With the processing so far, the DDC control by the DDC controller 230 during the activation of the vehicle is terminated.

Operation and Effects

As it has been described so far, with the configuration that the unidirectional DDC is connected in parallel with the bidirectional DDC having the pre-charging function, when determining that the activating operation of the vehicle is performed, the DDC controller according to the second embodiment of the disclosure first starts actuating the bidirectional DDC only to pre-charge the capacitor. Then, after the voltage of the capacitor acquired from the bidirectional DDC becomes equal to or higher than the specified value, the DDC controller starts actuating the unidirectional DDC. That is, when the vehicle is activated, the DDC controller delays the actuation initiation timing of the unidirectional DDC from the actuation initiation timing of the bidirectional DDC by a time required until the voltage of the capacitor to be pre-charged reaches the specified value.

Just as described, the completion of the pre-charging of the capacitor is determined from the voltage, and the unidirectional DDC is actuated later than the bidirectional DDC. In this way, such a route that the power to be supplied from the second battery to the capacitor for the pre-charging of the capacitor by the bidirectional DDC returns to the second battery through the unidirectional DDC is not formed. Therefore, the DDC controller can suitably pre-charge the capacitor by using the power of the second battery.

Modified Embodiment

The above description has been made on the method for detecting the completion of the pre-charging of the capacitor 30 by the DDC controller 230 based on the voltage V of the capacitor 30 that is sequentially acquired from the bidirectional DDC 210. However, the DDC controller 230 can detect the completion of the pre-charging in a method other than the method.

Figure 5:
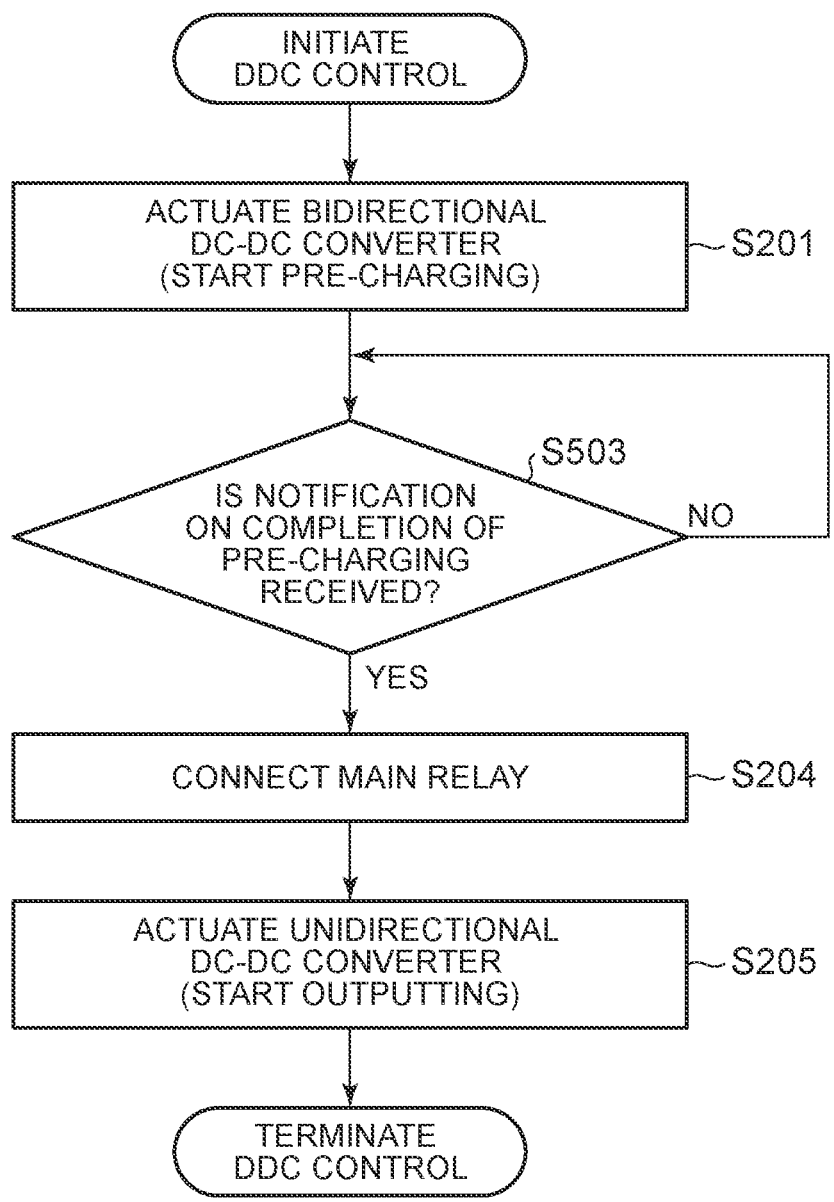
FIG. 5 is a control flowchart of a modified embodiment executed by the DC-DC converter controller illustrated in FIG. 3.

For example, the bidirectional DDC 210 determines whether the voltage V of the capacitor 30 is equal to or higher than the specified value THv. Then, when the voltage V becomes equal to or higher than the specified value THv, the bidirectional DDC 210 sends a specified notification that the pre-charging is completed to the DDC controller 230. In this case, as in the flowchart illustrated in FIG. 5, after the DDC controller 230 starts actuating the bidirectional DDC 210 (step S201), the DDC controller 230 determines whether the notification on the completion of the pre-charging is received from the bidirectional DDC 210 (step S503). Then, when the notification is received (step S503, YES), the DDC controller 230 connects the main relay 20 and starts actuating the unidirectional DDC 120 (steps S204, S205).

Even in such control, the actuation initiation timing of the unidirectional DDC can be delayed from the actuation initiation timing of the bidirectional DDC, and thus the capacitor can suitably be pre-charged by using the power of the second battery.

Third Embodiment

Configuration

Figure 6:
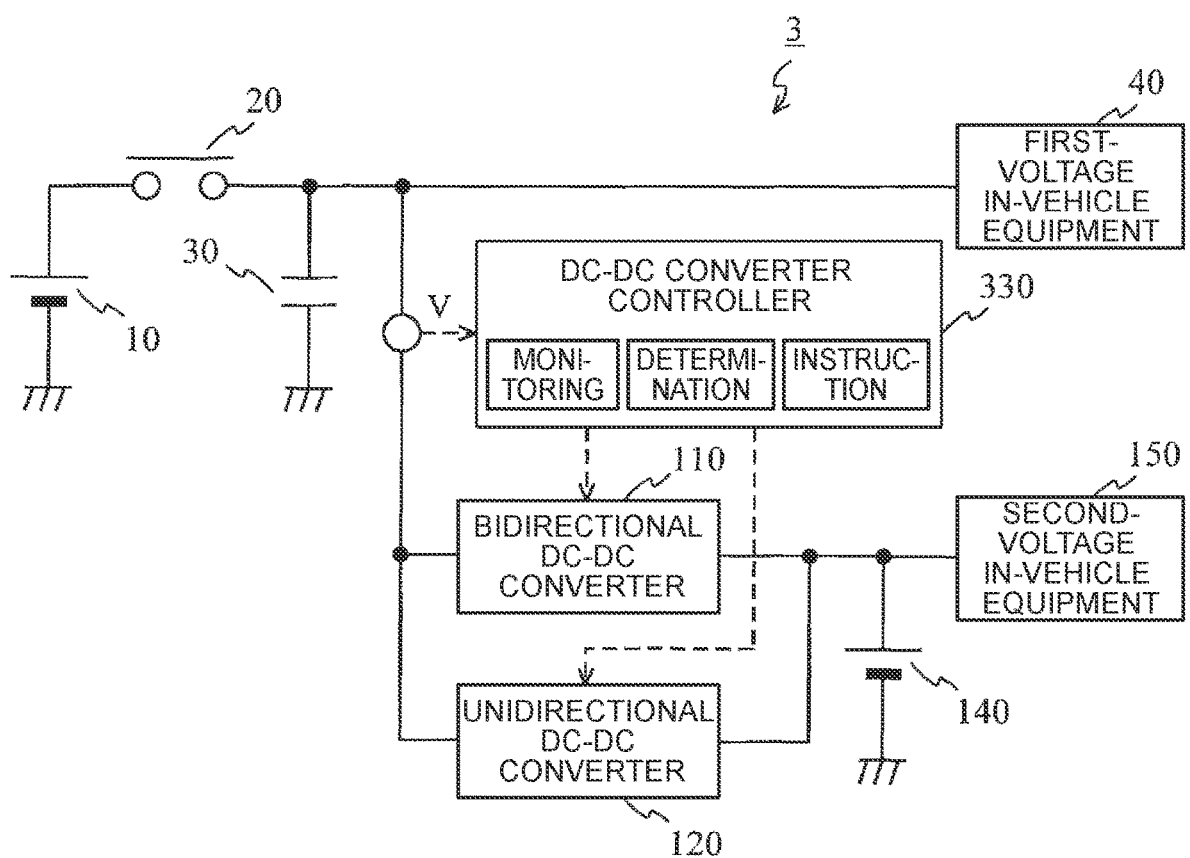
FIG. 6 is a schematic configuration diagram of a power supply system that includes a DC-DC converter controller according to a third embodiment.

FIG. 6 is a block diagram illustrating a schematic configuration of a power supply system 3 that includes a DC-DC converter controller according to a third embodiment. The power supply system 3 exemplified in FIG. 6 includes the first battery 10, the main relay 20, the capacitor 30, the first-voltage in-vehicle equipment 40, the bidirectional DC-DC converter 110, the unidirectional DC-DC converter 120, a DC-DC converter controller 330 of this embodiment, the second battery 140, and the second-voltage in-vehicle equipment 150. In FIG. 6, the power lines are indicated by solid lines, and the control signal lines are indicated by broken lines. As the vehicle on which the power supply system 3 is mounted, the hybrid vehicle (HV) or the electric vehicle (EV) can be exemplified.

The DDC controller 330 in the power supply system 3 according to this third embodiment have a different configuration from the DDC controller 130 in the above-described power supply system 1 according to the first embodiment. Hereinafter, a description on the third embodiment will be centered on the different configuration. The same configurations will be denoted by the same reference numerals and will only partially be described.

The DDC controller 330 controls the operation of the bidirectional DDC 110 and the unidirectional DDC 120 based on the vehicle state acquired from the in-vehicle equipment and the state of the capacitor 30 monitored by the DDC controller 330. The DDC controller 330 can be constructed of the ECU that typically includes the processor, the memory, the input/output interface, and the like. The DDC controller 330 can include some or all of the ECUs mounted on the vehicle, such as the ECU capable of controlling the connected/disconnected state of the main relay 20, the ECU capable of controlling output voltage values of the bidirectional DDC 110 and the unidirectional DDC 120, and the ECU capable of monitoring the state of the capacitor 30. The DDC controller 330 in this embodiment implements functions of monitoring, determination, and instruction, which will be described later, when the processor reads and executes the program stored in the memory.

Based on the ignition-ON signal and the READY-ON signal acquired from the specified in-vehicle equipment, the DDC controller 330 determines whether the activating operation is performed for the vehicle. When the activating operation of the vehicle is performed, the DDC controller 330 provides the activating instruction to the bidirectional DDC 110 so as to start actuating the bidirectional DDC 110. Then, the DDC controller 330 monitors the voltage V of the capacitor 30 via voltage detection means such as a voltage sensor. The DDC controller 330 may include or may not include the voltage detection means. Thereafter, in the case where the monitored voltage V of the capacitor 30 becomes equal to or higher than the specified value, the DDC controller 330 provides the activating instruction so as to the unidirectional DDC 120 to start actuating the unidirectional DDC 120.

Control

Figure 7:
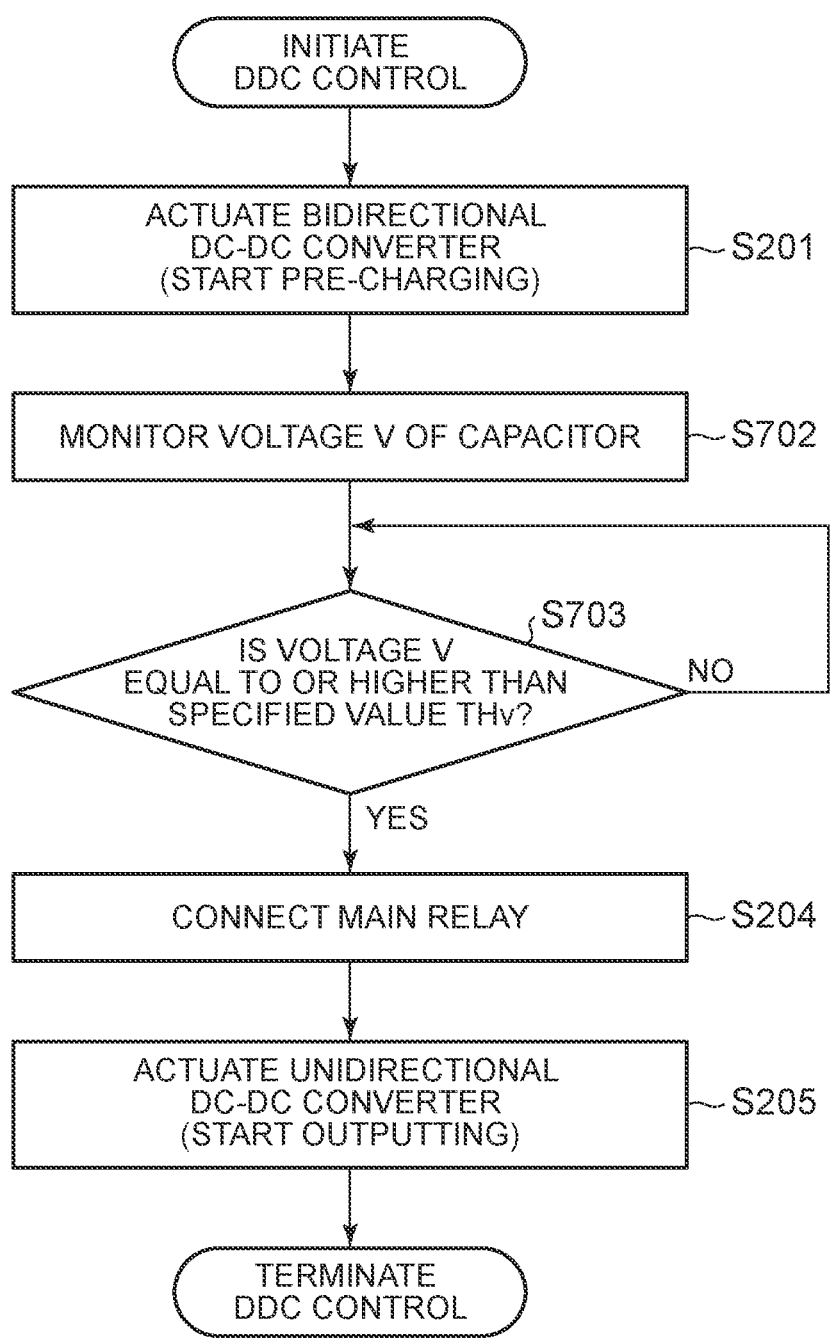
FIG. 7 is a control flowchart executed by the DC-DC converter controller illustrated in FIG. 6.

A description will be made on control executed by the DDC controller 330 according to the third embodiment with further reference to the drawing. FIG. 7 is a flowchart illustrating a processing procedure of DC-DC converter control (DDC control) executed by the DDC controller 130. The DDC control illustrated in FIG. 7 differs from the DDC control illustrated in FIG. 2 in terms of processing in steps S702 and S703.

Step S201: The DDC controller 330 starts actuating the bidirectional DDC 110 and controls the bidirectional DDC 110 to the state where the power of the second battery 140 is output to the capacitor 30. In this way, the pre-charging of the capacitor 30 is initiated.

Step S702: The DDC controller 330 monitors the voltage V of the capacitor 30.

Step S703: The DDC controller 330 determines whether the monitored voltage V of the capacitor 30 has become equal to or higher than the specified value THv. The specified value THv is as described above. In this way, the DDC controller 330 can detect the completion of the pre-charging of the capacitor 30. If the voltage V is equal to or higher than the specified value THv (step S703, YES), the processing proceeds to step S704. If not (step S703, NO), the determination in step S703 is repeatedly made until the voltage V becomes equal to or higher than the specified value THv.

Step S204: The DDC controller 330 controls the main relay 20 in the connected state. The vehicle is actually activated only after the control is terminated.

Step S205: The DDC controller 330 starts actuating the unidirectional DDC 120 and starts outputting the power from the side of the first battery 10 and the capacitor 30 to the side of the second battery 140 and the second-voltage in-vehicle equipment 150. In addition, in conjunction with the completion of the pre-charging of the capacitor 30, the DDC controller 330 switches the bidirectional DDC 110 to the state of outputting the power of the first battery 10 and the capacitor 30 to the second battery 140 and the second-voltage in-vehicle equipment 150.

With the processing so far, the DDC control by the DDC controller 330 during the activation of the vehicle is terminated.

Operation and Effects

As it has been described so far, with the configuration that the unidirectional DDC is connected in parallel with the bidirectional DDC having the pre-charging function, when determining that the activating operation of the vehicle is performed, the DDC controller according to the third embodiment of the disclosure first starts actuating the bidirectional DDC only to pre-charge the capacitor. Then, after the voltage of the capacitor monitored by the DDC controller becomes equal to or higher than the specified value, the DDC controller starts actuating the unidirectional DDC. That is, when the vehicle is activated, the DDC controller delays the actuation initiation timing of the unidirectional DDC from the actuation initiation timing of the bidirectional DDC by the time required until the voltage of the capacitor to be pre-charged reaches the specified value.

Just as described, the completion of the pre-charging of the capacitor is determined from the voltage, and the unidirectional DDC is actuated later than the bidirectional DDC. In this way, such a route that the power to be supplied from the second battery to the capacitor for the pre-charging of the capacitor by the bidirectional DDC returns to the second battery through the unidirectional DDC is not formed. Therefore, the DDC controller can suitably precharge the capacitor by using the power of the second battery.

Fourth Embodiment

Configuration

Figure 8:
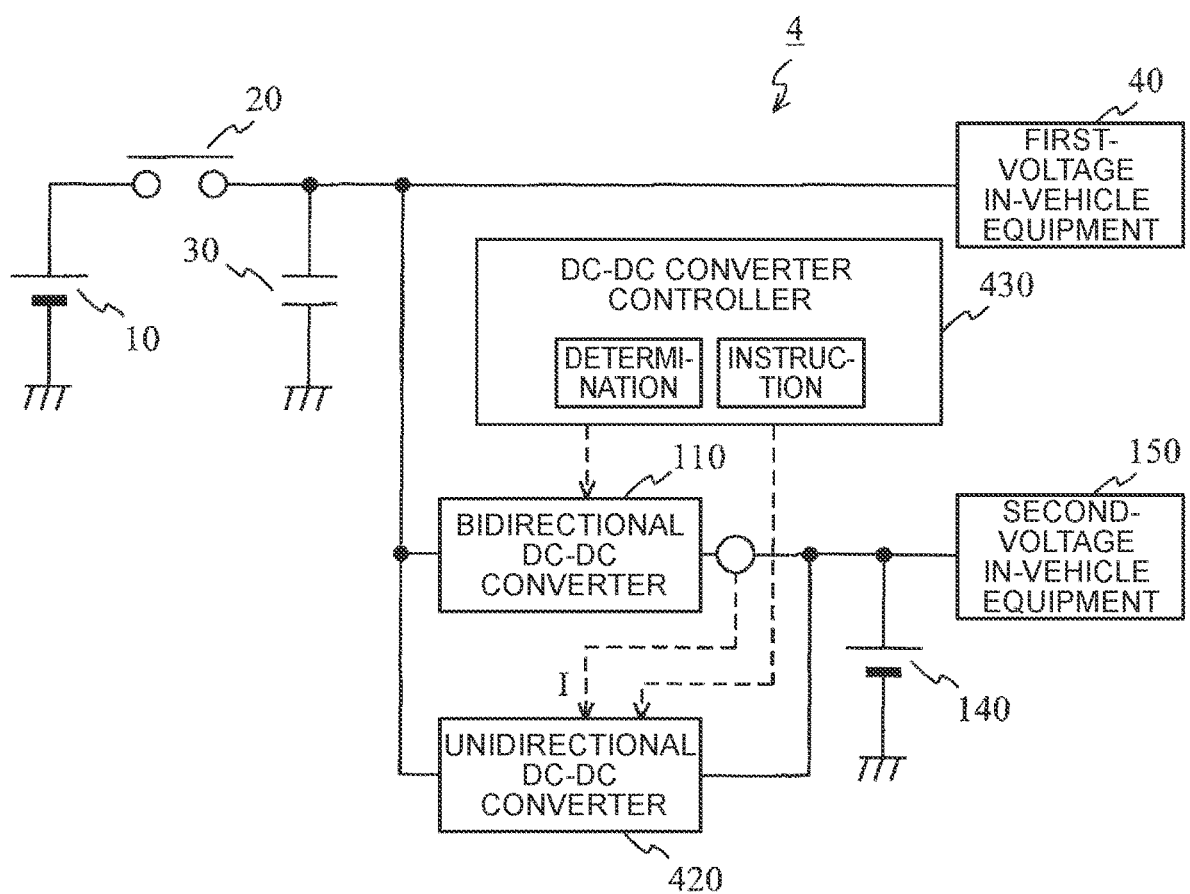
FIG. 8 is a schematic configuration diagram of a power supply system that includes a DC-DC converter controller according to a fourth embodiment.

FIG. 8 is a block diagram illustrating a schematic configuration of a power supply system 4 that includes a DC-DC converter controller according to a fourth embodiment. The power supply system 4 exemplified in FIG. 8 includes the first battery 10, the main relay 20, the capacitor 30, the first-voltage in-vehicle equipment 40, the bidirectional DDC 110, a unidirectional DDC 420, a DDC controller 430 of this embodiment, the second battery 140, and the second-voltage in-vehicle equipment 150. In FIG. 8, the power lines are indicated by solid lines, and the control signal lines are indicated by broken lines. As the vehicle on which the power supply system 4 is mounted, the hybrid vehicle (HV) or the electric vehicle (EV) can be exemplified.

The unidirectional DDC 420 and the DDC controller 430 in the power supply system 4 according to this fourth embodiment have different configurations from the bidirectional DDC 110 and the DDC controller 130, respectively, in the above-described power supply system 1 according to the first embodiment. Note that the bidirectional DDC 110 may be replaced with the bidirectional DDC 210 capable of sending the information on the voltage V of the capacitor 30 to the DDC controller 430. Hereinafter, a description on the fourth embodiment will be centered on these different configurations. The same configurations will be denoted by the same reference numerals and will only partially be described.

The unidirectional DDC 420 is a DC-DC converter that is connected between the capacitor 30 and the second-voltage in-vehicle equipment 150, that is connected in parallel with the bidirectional DDC 110, that can convert the voltage only in one direction, and that can output the converted voltage. More specifically, the unidirectional DDC 420 supplies the power of the first battery 10, which is connected to the primary side, to the second battery 140 and the second-voltage in-vehicle equipment 150, which are connected to the secondary side. When supplying the power, the unidirectional DDC 420 can transform the voltage of the first battery 10, which is the input voltage on the primary side, to be the output voltage on the secondary side. Furthermore, the unidirectional DDC 420 is configured to be able to monitor a current I output to the second-voltage in-vehicle equipment 150 by the bidirectional DDC 110 and to be able to control an operation state of the unidirectional DDC 420 according to the output current I (a magnitude and a flow direction of the current I) to be monitored. For example, the unidirectional DDC 420 can monitor the output current I of the bidirectional DDC 110 via current detection means such as a current sensor that is provided on the secondary side of the bidirectional DDC 110. Note that the current detection means may be provided on the primary side of the bidirectional DDC 110.

The DDC controller 430 controls the operation of the bidirectional DDC 210 and the unidirectional DDC 120 based on the vehicle state acquired from the in-vehicle equipment. The DDC controller 430 can be constructed of the ECU that typically includes the processor, the memory, the input/output interface, and the like. The DDC controller 430 can include some or all of the ECUs mounted on the vehicle, such as the ECU capable of controlling the connected/disconnected state of the main relay 20 and the ECU capable of controlling the output voltage values of the bidirectional DDC 210 and the unidirectional DDC 120. The DDC controller 430 in this embodiment implements functions of determination and instruction, which will be described later, when the processor reads and executes the program stored in the memory.

Based on the ignition-ON signal and the READY-ON signal acquired from the specified in-vehicle equipment, the DDC controller 430 determines whether the activating operation is performed for the vehicle. Then, when the activating operation of the vehicle is performed, the DDC controller 430 provides an activating instruction to the bidirectional DDC 110 and the unidirectional DDC 420 so as to start actuating the bidirectional DDC 110 and the unidirectional DDC 420.

Control

Figure 9:
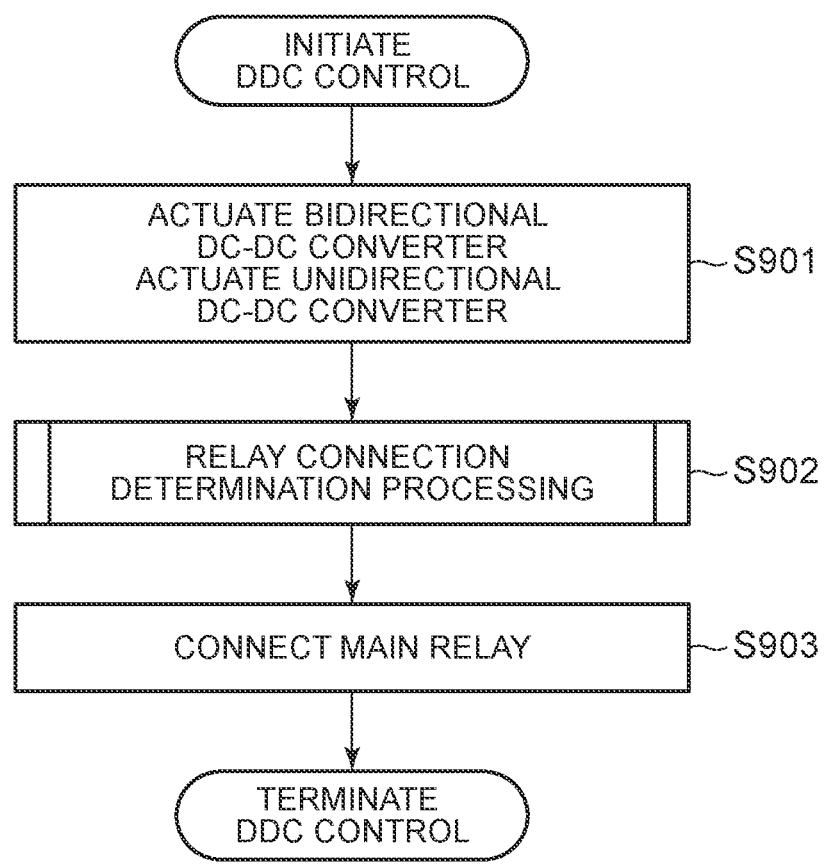
FIG. 9 is a control flowchart executed by the DC-DC converter controller illustrated in FIG. 8.
Figure 10:
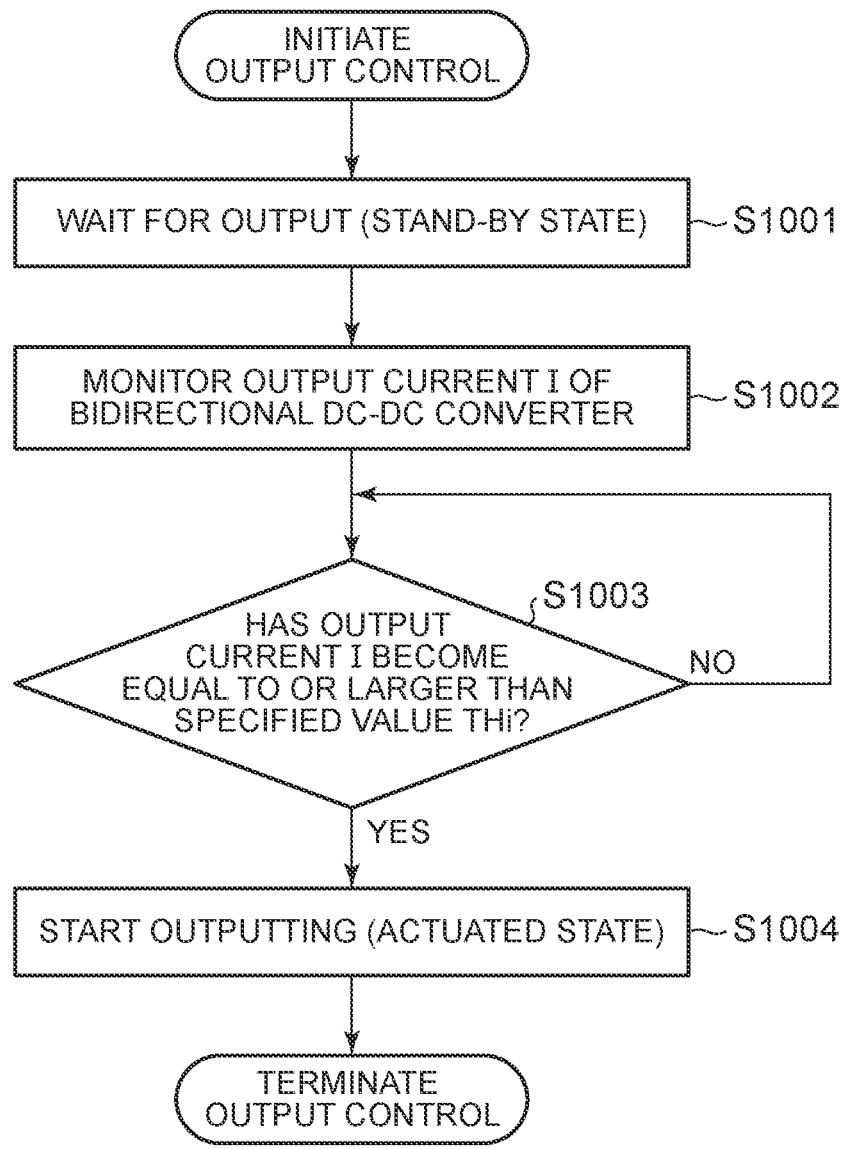
FIG. 10 is a control flowchart executed by the DC-DC converter controller illustrated in FIG. 8.

A description will be made on control executed by the unidirectional DDC 420 and the DDC controller 430 according to the fourth embodiment with further reference to the drawings. FIG. 9 is a flowchart illustrating a processing procedure of DC-DC converter control (DDC control) executed by the DDC controller 430. FIG. 10 is a flowchart of a processing procedure of output control that is executed by the unidirectional DDC 420.

The DDC control illustrated in FIG. 9 is initiated when it is determined that the activating operation of the vehicle is performed in the disconnected state of the main relay 20.

Step S901: The DDC controller 430 provides the activating instruction to the bidirectional DDC 110 and the unidirectional DDC 420 and starts actuating the bidirectional DDC 110 and the unidirectional DDC 420. By the activating instruction, the bidirectional DDC 110 is controlled to the state of outputting the power of the second battery 140 to the capacitor 30. In this way, the capacitor 30 starts being pre-charged by using the power of the second battery 140. Meanwhile, the unidirectional DDC 420 executes processing in FIG. 10, which will be described later, in response to the activating instruction.

Step S902: The DDC controller 430 executes processing to determine timing to connect the disconnected main relay 20 (relay connection determination processing). Any of the processing described in the first, second, and third embodiments described above can be applied to the relay connection determination processing in step S902.

For example, in the case where the processing in the first embodiment (FIG. 2) is applied, step S202, in which the bidirectional DDC 110 is actuated and the timekeeping is started at the same time, and step S203, in which it is determined whether the specified time t has elapsed since the bidirectional DDC 110 starts being actuated, can be executed. Meanwhile, in the case where the processing in the second embodiment (FIG. 4) is applied, step S402, in which the voltage V of the capacitor 30 is sequentially acquired from the actuated bidirectional DDC 210, and step S403, in which it is determined whether the acquired voltage V of the capacitor 30 has become equal to or higher than the specified value THv, can be executed. In the case where the modified embodiment of the second embodiment (FIG. 5) is applied, step S503, in which it is determined whether the specified notification on the completion of the pre-charging is received, can be executed. Furthermore, in the case where the processing in the third embodiment (FIG. 7) is applied, step S702, in which the voltage V of the capacitor 30 is monitored, and step S703, in which it is determined whether the monitored voltage V of the capacitor 30 has become equal to or higher than the specified value THv, can be executed.

Step S903: The DDC controller 430 controls the main relay 20 in the connected state. The vehicle is actually activated only after the control is terminated.

The output control illustrated in FIG. 10 is initiated when the activating instruction is received from the DDC controller 430.

Step S1001: In response to the activating instruction received from the DDC controller 430, the unidirectional DDC 420 is activated in a stand-by state where the unidirectional DDC 420 waits for current output to the second-voltage in-vehicle equipment 150.

Step S1002: The unidirectional DDC 420 monitors the output current I of the bidirectional DDC 110.

Step S1003: The unidirectional DDC 420 determines whether the monitoring output current I of the bidirectional DDC 110 has become equal to or larger than a specified value THi. The specified value THi is typically set based on the current at the time when the bidirectional DDC 110 outputs the current from the first battery 10 side in a direction toward the second battery 140 after the pre-charging is completed. More specifically, in the case where the direction from the first battery 10 toward the second battery 140 is set as positive (+) and an opposite direction therefrom is set as negative (−), the specified value THi is set to be equal to or larger than zero (THi>0). If the output current I has become equal to or larger than the specified value THi (step S1003, YES), the processing proceeds to step S1004. If not (step S1003, NO), the determination in step S1003 is repeatedly made until the output current I becomes equal to or larger than the specified value THi.

Step S1004: The unidirectional DDC 420 is switched from the stand-by state to an actuation state where the unidirectional DDC 420 starts the current output to the second battery 140 and the second-voltage in-vehicle equipment 150.

With the processing so far, the DDC control by the unidirectional DDC 420 and the DDC controller 430 during the activation of the vehicle is terminated.

Action and Effects

As it has been described so far, with the configuration that the unidirectional DDC according to the fourth embodiment of the disclosure is connected in parallel with the bidirectional DDC having the pre-charging function, when receiving the activating instruction upon the activating operation of the vehicle, the unidirectional DDC determines the completion of the pre-charging of the capacitor based on the monitored output current of the bidirectional DDC, and then starts outputting the current. That is, when the vehicle is activated, the actuation initiation timing of the unidirectional DDC is delayed from the actuation initiation timing of the bidirectional DDC until the pre-charging of the capacitor is completed.

Just as described, the completion of the pre-charging of the capacitor is determined from the output current, and the unidirectional DDC is actuated later than the bidirectional DDC. In this way, such a route that the power to be supplied from the second battery to the capacitor for the pre-charging of the capacitor by the bidirectional DDC returns to the second battery through the unidirectional DDC is not formed. Therefore, the DDC controller can suitably pre-charge the capacitor by using the power of the second battery.

In addition, as in this fourth embodiment, by using the unidirectional DDC that can determine the completion of the pre-charging of the capacitor using the output current of the bidirectional DDC, the existing DDC controller can be used as is without needs for a design change and the like, and suited pre-charging control of the capacitor can thereby be executed.

The description has been made so far on the embodiments of the disclosure. The disclosure can be comprehended as the DC-DC converter controller, the control method executed by the DC-DC converter, a control program thereof, a non-transitory computer readable recording medium storing the control program, or the vehicle on which the DC-DC converter controller and the DC-DC converter are mounted.

The DC-DC converter controller and the DC-DC converter according to the disclosure can be mounted on and used in the hybrid vehicle (HV) and the electric vehicle (EV).

What is claimed is:

1. A controller for a DC-DC converter mounted on a vehicle, the DC-DC converter including:
    a bidirectional DC-DC converter that is connected between a capacitor for pre-charging connected to a first battery and a second battery differing from the first battery and can perform bidirectional output; and
    a unidirectional DC-DC converter that is connected in parallel with the bidirectional DC-DC converter and can perform output in one direction to a side of the second battery,
    the controller being configured to during activation of a vehicle:
    actuate the bidirectional DC-DC converter to start pre-charging the capacitor by using power of the second battery; and
    start actuating the unidirectional DC-DC converter later than initiation of the actuation of the bidirectional DC-DC converter.

2. The controller according to claim 1, wherein the controller is configured to:
    after a specified time elapses after starting actuating the bidirectional DC-DC converter, start actuating the unidirectional DC-DC converter.

3. The controller according to claim 2, wherein
    the specified time is set based on a time required until the pre-charging of the capacitor is completed.

4. The controller according to claim 1, wherein the controller is configured to:
    detect completion of the pre-charging of the capacitor after starting actuating after the bidirectional DC-DC converter; and
    start actuating the unidirectional DC-DC converter after detection of completion of the pre-charging.

5. The controller according to claim 4, wherein
    the controller is configured to determine that the pre-charging of the capacitor is completed when a voltage of the capacitor acquired from the bidirectional DC-DC converter is equal to or higher than a specified voltage value.

6. The controller according to claim 4, wherein the controller is configured to determine that the pre-charging of the capacitor is completed when receiving specified notification that is based on a voltage of the capacitor from the bidirectional DC-DC converter.

7. The controller according to claim 4, wherein the controller is configured to acquire a voltage of the capacitor and, if the acquired voltage is equal to or higher than a specified voltage value, determine that the pre-charging of the capacitor is completed.

8. The controller according to claim 1, wherein the capacitor is connected to the first battery via a relay, and the controller is configured to:

actuate the bidirectional DC-DC converter in a disconnected state of the relay during the activation of the vehicle so as to start pre-charging the capacitor by using the power of the second battery; and after starting actuating the bidirectional DC-DC converter and the relay is closed, start actuating the unidirectional DC-DC converter.

9. A unidirectional DC-DC converter configured to:

be connected between a primary side and a secondary side of a vehicle;

perform unidirectional output from the primary side to the secondary side;

be connected in parallel with a bidirectional DC-DC converter configured to perform bidirectional output, the bidirectional DC-DC converter being configured to:
  monitor a current flowing from the primary side in a direction toward the secondary side;
  perform output when the monitored current is equal to or larger than a specified current value; and
  stop the output when the monitored current is smaller than the specified current value; and during activation of the vehicle, actuate later than initiation of actuation of the bidirectional DC-DC converter.

10. The unidirectional DC-DC converter according to claim 9, wherein the unidirectional DC-DC converter is configured to monitor the current by a current sensor that is provided on the secondary side of the vehicle.

* * * * *